United States Patent
Kappe et al.

(10) Patent No.: US 6,827,283 B2
(45) Date of Patent: Dec. 7, 2004

(54) PRODUCT WITH A SECURITY ELEMENT

(75) Inventors: Frank Kappe, Rheda-Wiedenbruk (DE); Dirk Fischer, Paderborn (DE); Lothar Fannasch, Bielefeld (DE); Michael Hennemeyer-Schwenker, Lichtenau-Herbram (DE); Mathias Schumacher, Borchen (DE)

(73) Assignee: Orga Kartensysteme GmbH, Paderborn (DE)

( * ) Notice: Subject to any disclaimer, the term of this patent is extended or adjusted under 35 U.S.C. 154(b) by 0 days.

(21) Appl. No.: 10/380,944

(22) PCT Filed: Jun. 26, 2001

(86) PCT No.: PCT/DE01/02297
§ 371 (c)(1),
(2), (4) Date: Jul. 23, 2003

(87) PCT Pub. No.: WO02/27647
PCT Pub. Date: Apr. 4, 2002

(65) Prior Publication Data
US 2004/0007625 A1 Jan. 15, 2004

(30) Foreign Application Priority Data
Sep. 21, 2000 (DE) .......................... 100 47 450

(51) Int. Cl.⁷ .............................................. G06K 19/06
(52) U.S. Cl. ...................................................... 235/494
(58) Field of Search ................................ 235/494, 487; 156/272.8

(56) References Cited
U.S. PATENT DOCUMENTS 4,538,059 A * 8/1985 Rudland ..................... 235/468
4,663,518 A    5/1987 Borror et al.
4,766,026 A * 8/1988 Lass et al. .................. 428/203
4,894,110 A * 1/1990 Lass et al. ................ 156/272.8

FOREIGN PATENT DOCUMENTS

EP          0 219 011         4/1987

* cited by examiner

Primary Examiner—Thien M. Le
Assistant Examiner—Lisa M. Caputo
(74) Attorney, Agent, or Firm—Foley & Lardner LLP

(57) ABSTRACT

The invention relates especially to a method for producing a product that is secure against fraud, i.e. a security product. The inventive method for producing a security product with a high degree of protection against fraud or tampering is characterized as follows: in a first step, a non-personalized and/or non-individualized support is provided with a non-personalized and/or non-individualized security element (100); in a second step and/or in further steps, the non-personalized and/or non-individualized support and the non-personalized and/or non-individualized security element (100) are personalized and/or individualized; a structure (101) that is optically effective in the security element (100) produces at least two especially, color effects; at least one of the color effects (106,107) only appears within a certain angular range to a vertical to the surface of the security element, and a personalizable and/or individualizable layer (102) that is provided in the security element (100) and/or a personalized and/or individualized layer that is provided in the security element (100) shows personalization and/or individualization information.

16 Claims, 2 Drawing Sheets

PRODUCT WITH A SECURITY ELEMENT

BACKGROUND OF THE INVENTION

1. Field of the Invention

The invention relates to a security element, a security product, a method for its personalization and/or its individualization and also an apparatus for its production and an apparatus for its personalization according to the preamble of the relevant independent claim.

2. Description of the Related Art

For the personalization of data carriers, such as identity cards or ID cards, laser labeling, that is blackening by laser radiation, of the surface of the data carrier or the card body is a method which is established and used widely because of the high protection against forgery.

In order to improve the protection against forgery, the patent applications DE 42 43 987 A1 and EP 0 219 011 A2 propose personalized laser labeling or blackening by laser radiation of at least two layers arranged one above another in a data carrier. In this form of laser labeling, an item of security information in the form of an image or text is distributed to two or more planes.

The disadvantage with personalization information produced in such a manner is that this cannot readily be distinguished from a simple, forged imprint of a different item of personalization information likewise in a black color.

Another variant for increasing the protection against forgery is disclosed by EP 0 105 099 A1. This European laid-open specification proposes the provision of an integrated optically variable element on each of the valuable documents to be secured thereby. The optically variable element is a diffraction structure or a diffraction grating. When tilted or rotated, it appears to the observer as though a predefined pattern moves quasi-continuously over the element. The production of such an element and its introduction into the valuable document is complicated and therefore expensive. The personalization or individualization of such an element for improving the protection against forgery is certainly desirable but falls down on the higher production costs, in particular in the case of a mass-produced article to be protected.

SUMMARY OF THE INVENTION

The invention is based in particular on the object of providing a security element with high protection against forgery or counterfeiting.

The object is respectively achieved by the features specified in the independent patent claims. Advantageous refinements of the invention are specified in the independent claims.

The first substantial aspect of the invention comprises the provision of an element that is secured against forgery and/or counterfeiting, that is to say a security element, which has at least two layers of different color arranged above one another. Because each of the layers is provided with part of an item of personalization and/or individualizing information, the result is a multicolored item of personalization information and/or individualization information which is distributed to two or more planes and, without aids, as a result of tilting or rotation of the security element or a security product provided with the security element, can be distinguished from a simple, correspondingly colored imprint.

A second substantial aspect of the invention consists in equipping each of the at least two layers lying above one another in such a way that their color can be changed in each case, partially or at some points. This permits the production of a large number of security elements or security products according to the invention in a mass-production process, in this case each provided with a security element according to the invention. Each security element according to the invention and/or security product which has a security element according to the invention can subsequently be personalized or individualized in a separate, later step. This permits both the cost-effective production and the cost-effective personalization of a security element or security product with high security against forgery or counterfeiting. Its authenticity can additionally be checked simply and quickly by visual means.

A third substantial aspect of the invention comprises forming the personalization information or the individualized information by image points. Each image point is preferably formed at least by a first colored region of a first layer of the layers whose color can be changed and a second colored region of a second layer of the layers whose color can be changed. According to the invention, these regions are preferably arranged above one another with a vertical offset, in such a way that the second colored region of the second layer of the layers whose color can be changed wholly or partly covers the first colored region of the first layer of the layers whose color can be changed in a (vertical) plan view of the colored regions. The first and the second colored region preferably have largely the same dimensions and are merely offset vertically in relation to each other, but largely not offset laterally in relation to each other. In this case, it is advantageous that each of the image points exhibits an easily visible tilting effect or color change as a security feature when the security element or security product is tilted or rotated.

In a preferred embodiment of the invention, a largely transparent layer or film is in each case provided between the layers whose color can be changed, it being possible for the distance between the layers whose color can be changed to be set by choosing the thickness of the layer or film. By means of a suitable choice of the distance between the layers whose color can be changed, the tilting effect or color change can be set in the desired form.

A fourth substantial aspect of the invention is to configure the layers whose color can be changed in such a way that their color can be changed partially or at some points by means of laser radiation and, by means of such a color change, to produce an item of personalization information and/or individualizing information. Both the data carrier which has a security element according to the invention and the security element according to the invention itself can be personalized or individualized by means of laser radiation. For this purpose, all that is needed is a personalization apparatus which provides a suitable laser radiation or suitable laser radiations and guides the laser radiation over the data carrier and the security element in order to produce the item of personalization information.

For this purpose, it will generally be necessary to match the laser radiation in each case to the material of the data carrier, such as the material of the card body, and to the layers whose color can be changed. It is necessary in particular to match the wavelength or the wavelength range and/or the intensity or radiation power of the laser radiation.

If cost-effective layers of different colors which can be processed easily and whose color can be changed partially by one and the same laser radiation are available, the personalization information or individualizing information can advantageously be written into the security element according to the invention in only one step. This can then be done simultaneously, for example, image point by image point, in all the layers whose color can be changed.

The fact that laser radiation is required to personalize or individualize the security element according to the invention ensures that the personalization information or the individualizing information does not bleach or fade during normal use of the data carrier or under the action of artificial light and/or daylight. A fifth substantial aspect of the invention consists in providing the security element according to the invention with layers whose color can partially be changed and whose color can be changed independently of one another by different laser radiations, in particular with regard to the wavelength or wavelength range and/or radiation intensity. In this way, if an appropriate personalization apparatus is used, each layer or plane of the security element can be provided individually with part of the personalization information or individualizing information, it being possible for the part of the personalization information or individualizing information in one plane to differ from that in another plane. This permits the use of a complicated structure for the personalization information or individualizing information. A forger would therefore have to procure both an unpersonalized security product according to the invention and also the very specific personalization apparatus, which, with relatively little effort, can largely be ruled out.

A sixth substantial aspect of the invention consists in configuring the layers whose color can be changed partially by suitable laser radiation in such a way, according to the invention, that the partial color change consists in irreversible bleaching or an irreversible, significant increase in the transparency to artificial light and/or daylight. It is therefore in any case possible for a forger to bleach an item of existing personalization information or individualizing information but not to write a new item of personalization information or a new item of individualizing information into a security element that has already been personalized. In addition, the authenticity of a security element or security product according to the invention can therefore be checked visually without aids.

It goes without saying that it is not necessarily necessary for all the above substantial aspects of the invention to be provided in one embodiment of the invention.

In an advantageous embodiment of the invention, the personalization information or individualizing information is formed by a large number of image points, between which there are transparent regions of the layers whose color can be changed. Through the transparent regions, preferably artificial light and/or daylight arrives at a reflective and/or scattering layer provided in the security element according to the invention, the reflected and/or scattered light passing at least partially through the regions of the layer whose color is not changed and/or the layer scattering and/or filtering the artificial light and/or daylight in its natural color and imparting to an item of personalization or individualizing information according to the invention or a security element according to the invention a characteristic tilting effect that can easily be perceived visually.

In an advantageous refinement of the invention, the security product provided with a security element according to the invention is an identity card, a credit card, a Eurocheque card, an insured person's card, a telephone card, a driver's license, an authorization card, an identification document, a product protection label, a banknote or the like.

In one embodiment of the invention, such as in the case of an identity card (ID card), the item of personalization information is the portrait, the signature and/or person-related data of the authorized card holder.

In one embodiment of the invention, provision is made for one of the layers whose color can be changed to have colorants of a first type, preferably colorants such as colored pigments which largely absorb blue light, for example from about 400–460 nm, and whose natural color is yellow. As an alternative or addition, provision is further made for one of the layers whose color can be changed to have colorants of a second type, preferably colorants such as colored pigments which largely absorb green light, for example from about 500–560 nm, and whose natural color is red or magenta.

Furthermore, as an alternative or addition, provision is made for one of the layers whose color can be changed to have colorants of a third type, preferably colorants such as colored pigments which largely absorb red light, for example from about 580–680 nm, and whose natural color is blue or cyan. By means of the combination, for example, of such layers in a security element according to the invention, the methods of additive and/or subtractive color mixing can be used to produce an item of personalization information according to the invention which exhibits a tilting effect or color change that can be detected clearly under artificial light and/or daylight.

The various colorants or mixtures of these colorants are, for example, applied with a vertical offset to the various layers or films of the card structure. As a result, in at least two different planes of the card structure, bleachable layers are obtained, it being possible for the first layer to be bleached with laser radiation of a first wavelength and for the second layer to be bleached with laser radiation of a second wavelength.

BRIEF DESCRIPTION OF THE DRAWINGS

The invention will be explained below using drawings which are not necessarily to scale, identical designations referring to identical or identically acting parts. In the drawings.

DETAILED DESCRIPTION OF THE EXEMPLARY EMBODIMENTS

Figure 1:
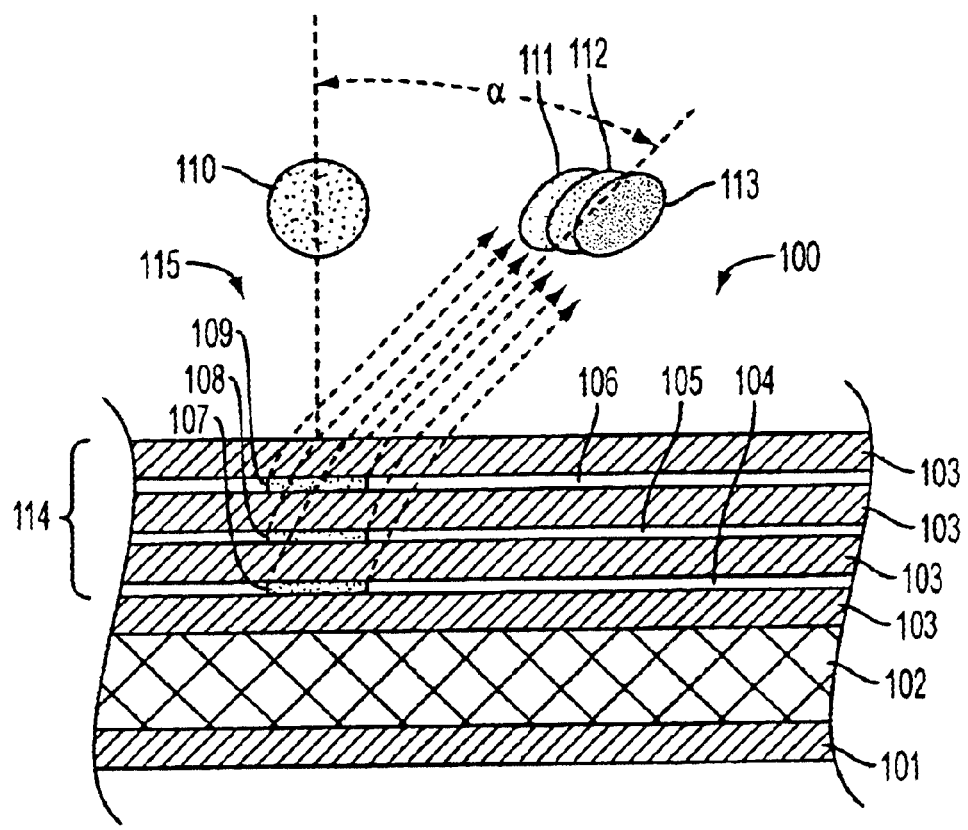
FIG. 1 shows the basic structure of a security element according to the invention, which forms part of a card body, using a cross-sectional drawing of the card body in the region of the security element.

FIG. 1 shows the basic structure of a security element 114 according to the invention, which forms part of a card body 100 according to the invention, using a cross-sectional drawing of the card body in the region of the security element.

In order to produce a card body 100 according to the invention, in a first step a transparent film 101, for example, is joined to an opaque core film 102 in a conventional way by lamination.

In order to form a security element 114 according to the invention on the aforementioned layers, a transparent cover film 103 is laminated on the opaque core film 102. Applied to the transparent cover film 103 is a first colored layer 104, to the latter a second transparent cover film 103, to the latter a second colored layer 105, to this a third transparent cover film 103, to the latter a third colored layer 106 and finally, ending on the latter, a fourth transparent cover film 103.

"Transparent" and the term "bleached" used below are intended in particular to be understood to mean that the relevant layer or film is largely or to a sufficient extent transparent to artificial light and/or daylight. The first colored layer 104, the second colored layer 105 and the third colored layer 106 according to the invention each have color and which permit the colored layers to be bleached or made transparent, in each case partially or at some points, independently of one another.

A preferred exemplary embodiment of the invention will be specified below. The first colored layer 104 according to the invention is provided with colored pigments of a first color or it consists of such colored pigments. The second colored layer 105 according to the invention is provided with colored pigments of a second color or it consists of such colored pigments. The third colored layer 106 according to the invention is provided with colored pigments of a third color or it consists of such colored pigments.

The first colored layer 104 according to the invention can be bleached partially by first laser radiation, whose wavelength or wavelengths and/or whose intensity is matched appropriately to the first colored layer 104. The second colored layer 105 according to the invention can be bleached partially with the second laser radiation, whose wavelength or wavelengths and/or whose intensity is matched appropriately to the second colored layer 105. The third colored layer 106 according to the invention can be bleached partially with the third laser radiation, whose wavelength or wavelengths and/or whose intensity is matched appropriately to the third colored layer 106.

Such a card body, which is wholly or partially provided with the security element 114 described, is distinguished in particular by the fact that the actual card body and the security element according to the invention are in each case present in an unpersonalized or respectively an unindividualized state. In this way, it is economically possible to personalize or to individualize the actual card body and also the security element according to the invention completely with a suitable laser apparatus.

The personalization of the security element according to the invention will be described in detail below:

A personalizing apparatus according to the invention (not illustrated) produces in a first step a first laser radiation whose wavelength and/or intensity is matched to the first colored layer 104 in such a way that it physically selectively bleaches or makes transparent the colorants contained in the first colored layer, such as in particular colored pigments of a first color.

In a second step, the personalizing apparatus according to the invention guides the first laser radiation over the surface of the security element 114 according to the invention and, in the process, produces selectively decolorized regions in the first colored layer 104. The regions which are not decolorized or not bleached form the first part of an item of personalization information or individualizing information in a first plane. By way of example, the first part of a first image point 115 of the item of personalization information or individualizing information which still has the first color is designated by the designation 107.

In a third step, the personalizing apparatus according to the invention produces a second laser radiation, whose wavelength and/or intensity is matched to the second colored layer 105 in such a way that the colorants contained in the second colored layer, such as in particular colored pigments of a second color, are physically selectively bleached or made transparent.

In a fourth step, the personalizing apparatus according to the invention guides the second laser radiation over the surface of the security element 114 according to the invention and, in the process, produces selectively decolorized regions in the second colored layer 105. The regions which are not decolorized or not bleached form a second part of an item of personalization information or individualizing information. By way of example, a second constituent of the item of personalization information or individualizing information which still has the second color is designated by the designation 108.

In a fifth step, the personalizing apparatus according to the invention produces a third laser radiation, whose wavelength and/or intensity is matched to the third colored layer 106 in such a way that it physically selectively bleaches or makes transparent colorants which are contained in the third layer, such as in particular colored pigments of a third color.

In a sixth step, the personalizing apparatus according to the invention guides the third laser radiation over the surface of the security element 114 according to the invention and, in the process, produces selectively decolorized regions in the third colored layer 106. The regions which are not decolorized or not bleached form the third and last part of the item of personalization information or individualizing information in a third plane. By way of example, the third part of the first image point 115 of the item of personalization information or individualizing information which still has the third color is designated by the designation 109.

In the particularly preferred embodiment of the invention illustrated in FIG. 1, the constituents of the item of personalization information or individualizing information which, according to the invention, can be created on two or more planes in corresponding colored layers, have largely the same dimensions and are merely offset vertically in relation to one another, as shown in FIG. 1.

It goes without saying that constituents of the personalization information or individualizing information created on different planes can be arranged to be offset laterally in relation to one another in a different exemplary embodiment (not illustrated) by the personalization method according to the invention.

The complete personalization information or individualizing information is therefore formed by a plurality of physically mutually separated image points (not illustrated) in the preferred exemplary embodiment of the invention, as explained in connection with FIG. 1. Each of the image points, of which only a single point 115 is illustrated in FIG. 1 for clarity, is in each case formed by a region 107, 108 and 109.

It goes without saying that the personalization information or individualizing information can also be formed by two colored layers or else more than three colored layers (not illustrated) in another exemplary embodiment. An exemplary embodiment with two colored layers is indicated in FIGS. 2 to 5.

In the case of an identity card or the like, for example, the item of personalization information can be the name of the cardholder, a portrait of the cardholder, the identity number or the like. In the case of a product label or the like, for example, the individualizing information can be a serial number or the like.

In a particularly preferred embodiment of the invention, the personalizing apparatus produces the personalization information or the individualizing information in the manner described above in the security element 114 according to the invention and additionally personalizes the card body 100, for example in a further personalization step. The personalization of the card body or other security product is carried out in the same way as the personalization of the security element, preferably likewise by means of laser radiation. The laser radiation produced in order to personalize the card body or other security product is in this case matched, in particular with regard to wavelength and/or intensity, to the material of the card body or of the security product, in such a way that the latter can be labeled and/or engraved by the laser radiation.

In a further particularly preferred embodiment of the invention, the first colored layer 104 has first colorants, such as in particular colored pigments, or consists of those which largely absorb blue light, for example light in the range from about 400–460 nm, and whose natural color is yellow. The second colored layer 105 in this exemplary embodiment has second colorants, such as in particular colored pigments, or consists of those which largely absorb green light, for example light in the range from about 500–560 nm, and whose natural color is red or magenta. The third colored layer 106 in this exemplary embodiment has third colorants, such as in particular colored pigments, or consists of those which largely absorb red light, for example light in the range from about 580–680 nm, and whose natural color is blue or cyan.

In the following text, the visual checking of the authenticity of a security element 114 according to the invention will be explained in more detail using the example of this particularly preferred embodiment of the invention above. If artificial light and/or daylight falls on the surface of the security element 114 according to the invention, then it passes through both the transparent cover films 103 and the regions of the colored layers 104, 105 and 106 bleached or made transparent during the personalization of the security element, and reaches the surface of the opaque core film 102. The opaque core film 102 is chosen, according to the invention, in such a way that it reflects and/or scatters the artificial light and/or daylight reaching it. Artificial light and/or daylight reflected and/or scattered by the opaque core film 102 passes from below through the unbleached region 107 of the first colored layer 104, which acts as a first color filter. The wavelengths of the artificial light and/or daylight that are not absorbed by the first unbleached region 107 pass from below through the unbleached region 108 of the second colored layer 105, which acts as a second color filter. The wavelengths that are not absorbed by the second unbleached region 108 will be held back by the unbleached region 109 in this exemplary embodiment because of the selected colors of the colored layers and the associated subtractive color mixing.

If the observer looks vertically at the unbleached regions 107, 108 and 109 located in different planes and arranged one above another, he sees an overall image 110 of an image point 115 of the personalization information which is black.

To check the authenticity, the observer tilts the security element 114 or the card body 100 according to the invention slowly. During the tilting action, at an angle α he sees an overall image comprising individual images 111, 112 and 113. During the tilting process, a change in the color of the overall image or image point 115 occurs, since the position of the individual images 111, 112 and 113 in relation to one another appears to change. This is an indication of the authenticity of the security element according to the invention, since this effect occurs only when the information forming the personalization information or individualizing information is distributed to different planes 104, 105 and 106. In the case of a simple imprint of the personalization information or individualizing information in one layer on a security product according to the invention or a security element according to the invention, this effect does not occur.

A particularly intense tilting effect may be achieved, according to the invention, by the layer thickness of the transparent films 103 between the colored layers 104, 105 and 106 being chosen to be greater than the lateral extent of the unbleached regions 107, 108 and 109. The unbleached regions 107, 108 and 109 together form a single one of many image points, whose entirety represents the personalization information and/or individualizing information. For reasons of clarity, however, only a single such image point 115 is illustrated in FIG. 1. The image points or unbleached regions are preferably in each case enclosed by transparent and/or bleached regions, so that an adequate amount of artificial light and/or daylight can reach the scattering, opaque core film 102. This permits the above described tilting effect to be clearly visible.

By using FIGS. 2 to 5, in the following text an exemplary embodiment of the personalization or individualization of a security element 114 according to the invention with the sequence of letters "ABCD" will be explained. As distinct from the security element 114 according to FIG. 1, the security element in this exemplary embodiment has only two colored layers 104 and 105. As compared with the security element 114 illustrated in FIG. 1, the colored layer 109 and the top transparent cover film 103 according to FIG. 1 are therefore missing.

Figure 2:
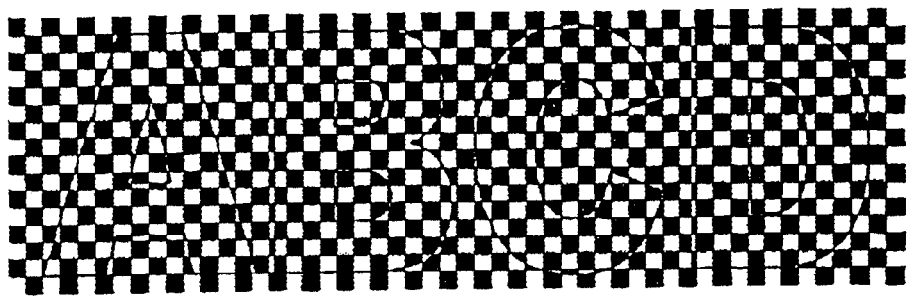
FIG. 2 shows the plan view of a first personalized colored layer of a first exemplary embodiment of a security element according to FIG. 1.

In a first personalization step, the colored layer 105 is selectively or partially bleached in the manner already described by means of first laser radiation matched to the colored layer 105, so that the checkerboard pattern 200 illustrated in FIG. 2 with the sequence of letters "ABCD" is produced. The checkerboard pattern 200 has first transparent regions and first regions whose color is not changed. In FIG. 2, the transparent regions are illustrated by white fields and the regions whose color is not changed are illustrated by black fields.

Figure 3:
FIG. 3 shows the plan view of a second personalized colored layer of the first exemplary embodiment of the security element according to FIG. 1.

In a second personalization step, the different colored layer 104 lying under the colored layer 105 is likewise selectively or partially bleached in the manner already described by means of second laser radiation matched to the colored layer 104, so that the checkerboard pattern 300 illustrated in FIG. 3 is produced. The checkerboard pattern 300 has second transparent regions and second regions whose color is not changed. In FIG. 3, the transparent regions are illustrated by white fields and the regions whose color is not changed are illustrated by gray fields.

Figure 4:
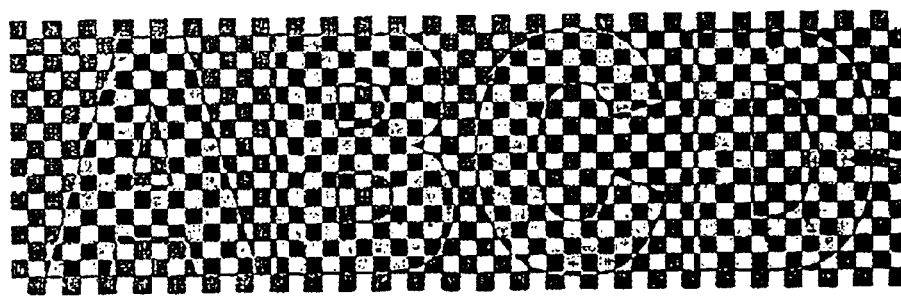
FIG. 4 shows the plan view of the colored layers from FIGS. 2 and 3 lying above one another and covering one another.

If the checkerboard patterns illustrated in FIGS. 2 and 3 are produced one above another so as to coincide, then an observer who views the surface of such a security element according to the invention vertically sees the overall image 400 shown in FIG. 4. In the sequence of letters "ABCD" that is visible in the plan view, the color of the colored layer 105 dominates as compared with the color of the colored layer 104.

Figure 5:
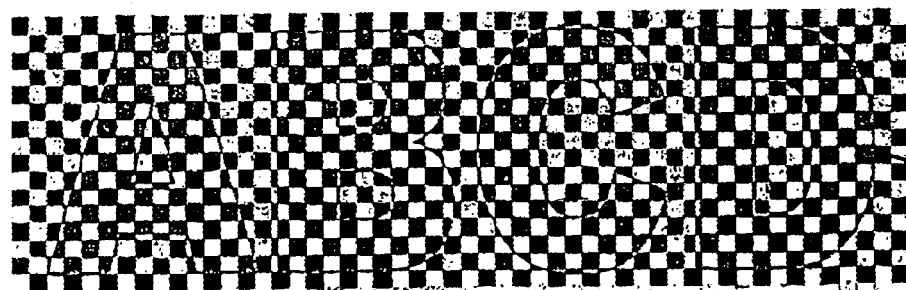
FIG. 5 shows the plan view of the colored layers from FIGS. 2 and 3 lying above one another and covering one another at an angle α.

If the security element according to the invention is tilted by the observer, then the overall image 500 shown in FIG. 5 manifests itself to the observer, in which figure, in the visible sequence of letters "ABCD", conversely, the color of the colored layer 104 now dominates as compared with the color of the colored layer 105. The color change in the personalization information, in this case the sequence of letters "ABCD", which is associated with the tilting of such a personalized security element according to the invention is particularly easy to see, in particular under artificial light and/or daylight, and permits simple, in particular visual, authenticity checking of such a security element according to the invention.

Figure 6:
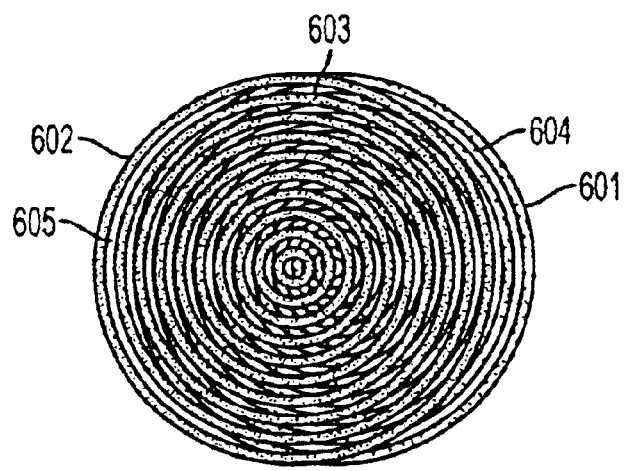
FIG. 6 shows the overall image of a second exemplary embodiment of a tilted security element according to the invention.

FIG. 6 shows the overall image of a further exemplary embodiment of a security element according to the invention at a tilt angle. The security element of this exemplary embodiment is provided with information that identifies the security element. This information is not information which personalizes or individualizes the security element but information which, for example, can be provided on a large number of security elements or card bodies, security products or the like provided with such a security element.

In this exemplary embodiment, use is made of a security element that—as in the preceding example—has only two colored layers 104 and 105 arranged above one another. In a first step, by means of laser radiation matched to the colored layer 104, concentric circles 601 are produced in the colored layer 104. The colored circles 601 are surrounded by transparent and/or bleached regions of the colored layer 104. In a second step, by means of laser radiation matched to the colored layer 105, concentric circles 602 are produced in the colored layer 105 in the manner described in the manner described. The circles 602 of a different color as compared with the colored circles 601 are surrounded by transparent regions 605 of the colored layer 105. In a (vertical) plan view (not illustrated), such a security element shows the observer an overall image which comprises concentric circles of a mixed color between the color of the colored layer 104 and the color of the colored layer 105. If the security element is tilted by an observer, then the overall image shown in FIG. 6 is produced, in which the concentric circles 601 and 602 cover each other only in subregions, like the region 603. This tilting effect can in particular be detected visually in a simple way and permits quick authenticity checking, in particular under artificial light and/or daylight. A simple imprint does not exhibit this tilting effect.

However, the invention is not restricted to concentric circles. Instead, all other types of line structures which exhibit the Moire effect are also claimed. A particularly preferred embodiment uses line structures in the form of guilloches, which are of particular importance in security printing.

In a preferred embodiment of the invention, one or more of the colored layers 104, 105 and 106 are applied by a printing process, such as in particular by offset printing, screen printing or simply doctoring on. The layer thickness of the colored layers, which are wholly or partly formed by colorants such as, in particular, colored pigments, can have a layer thickness of about 1 to 20 µm, for example. The cover films 103 typically have a thickness of about 50 to 100 µm. The individual layers or films, in particular in the case of an identity or ID card, are preferably chosen in such a way that the relevant card has the normal overall thickness for a corresponding card, such as about 800 µm.

If the security product is an identity or ID card, then as a rule use is made in a conventional way of a core film 102 which has fine complicated line structures, such as guilloches. The core film 102 can be formed from one or more laminated plastic or paper layers.

However, the invention is not restricted to the method according to the invention of selective bleaching for producing the colored personalization and/or individualizing information. Instead, a further method according to the invention can also be used for colored laser labeling. In this case, the production of the colored personalization and/or individualizing information is carried out by using photosensitive substances as the colorants in the layers whose color can be changed. These photosensitive substances are, for example, what are known as latent pigments and/or what are known as color formers. Such substances absorb no visible light or absorb it only to a very low extent. They therefore appear colorless or only weakly colored. With the aid of laser radiation or laser light, a chemical reaction is brought about in photosensitive layers which are provided with such a substance, during which reaction a colorant is formed.

As in the case of bleaching according to the invention, therefore, within the layers whose color can be changed, a partial color change is carried out by means of laser radiation of a suitable wavelength. As opposed to the use of bleachable colorants, in which the laser beam has the effect of increasing the transparency, the use of such substances as latent pigments or color formers increases the color intensity by means of the laser light. In the ideal case, such a substance permits the color intensity to be increased from 0 to a finite value. By using different substances of the aforementioned type in different layers, different colors are produced in the different layers, so that, as in the case of using bleachable substances such as bleachable pigments, the implementation of a security element according to the invention with a tilting effect is possible.

PARTS LIST

100 part of a card body with security element
101 transparent film
102 opaque core film
103 transparent cover film
104 first colored layer
105 second colored layer
106 third colored layer
107 unbleached region of the first colored layer
108 unbleached region of the second colored layer
109 unbleached region of the third colored layer
110 overall image of the unbleached regions in plan view
111 individual image of the unbleached region 109 at the tilt angle α
112 individual image of the unbleached region 108 at the tilt angle α
113 individual image of the unbleached region 107 at the tilt angle α
114 security element
115 image point
200 plan view of the colored layer 105 of a first exemplary embodiment of a security element according to the invention
300 plan view of the colored layer 104 of the first exemplary embodiment
400 vertical plan view of the security element according to the invention according to the first exemplary embodiment
401 image point
500 plan view of the security element according to the invention according to the first exemplary embodiment at an angle α

501 image point
601 concentric circle in the first plane formed by the colored layer 104
602 concentric circle in the second. plane formed by the colored layer 105
603 overlap region of a circle of the first plane with a circle of the second plane
604 transparent region in the colored layer 104
605 transparent region in the colored layer 105

What is claimed is:

1. An element secured against forgery and/or counterfeiting, id est a security element (114) comprising at least two layers (104, 105), that are arranged one above another with a vertical offset and whose color can be changed independently from the other in at least one region, characterized in that colored regions of higher located layers at least partly cover colored regions of lower located layers and the colored region (107) of the first layer (104) and the colored region (108) of the second layer (105) and, if appropriate, colored regions (109) of further layers that are arranged above the first two together form a part, such as in particular an image point (115, 401, 501), of a personalization information (ABCD) and/or of an information that individualizes the security element, such as in particular a portrait, a signature or person-related data, whereby this part of the personalization information (ABCD) and/or of an information that individualizes the security element (114) exhibits a color change when the security element (114) is tilted by a change of the size of the covered parts of the regions.

2. The security element as claimed in claim 1, characterized in that at least one colored region (108) of the second layer (105) covers at least one colored region (107) of the first layer (104).

3. The security element as claimed in claim 2, characterized in that the colored region (107) of the first layer (104) and the colored region (108) of the second layer (105) and, if appropriate, colored regions (109) lying above these and belonging to further layers (106) together form a part, such as in particular an image point (115; 401; 501), of an item of personalization information (ABCD) and/or an item of information that individualizes the security element, such as in particular a portrait, a signature or person-related data.

4. The security element as claimed in claim 1, characterized in that the transparent regions (604, 605) and/or the regions whose color can be changed have been at least partly created by laser radiation.

5. The security element as claimed in claim 1, characterized in that one of the layers whose color can be changed has colorants of a first type, preferably colorants such as colored pigments which largely absorb blue light, for example from about 400–460 nm, and whose natural color is yellow, and/or one of the layers whose color can be changed has colorants of a second type, preferably colorants such as colored pigments which largely absorb green light, for example from about 500–560 nm, and whose natural color is red or magenta and/or in that one of the layers whose color can be varied has colorants of a third type, preferably colorants such as colored pigments which largely absorb red light, for example from about 580–680 nm, and whose natural color is blue or cyan.

6. The security element as claimed in claim 5, characterized in that each of the first to third colorants can be bleached or made transparent by the action of optical radiation matched to the respective colorant, such as in particular laser radiation of specific wavelength and/or intensity.

7. The security element as claimed in claim 1, characterized in that the security element has a large number of such image points (115; 401; 501) which form the item of personalization information and/or the item of information that individualizes the security element, the image points which are formed by the colored regions (107, 108, 109) that are located one above another in various planes (104, 105, 106) exhibiting a color change, such as in particular a color fringe, when the security element (114) is tilted.

8. The security element as claimed in claim 1, characterized in that the layers whose color can be changed and/or the regions whose color can be changed and belong to the layers whose color can be changed have a colorant formed by laser radiation and, for this purpose, are preferably provided with what are known as latent pigments and/or with what are known as color formers.

9. A security product, characterized in that the security product (100) has a security element (114) as claimed in claim 1.

10. The security product as claimed in claim 9, characterized in that the security product is an identity card (100), a credit card, a Eurocheque card, an insured person's card, a telephone card, a driver's license, an authorization card, an identification document, a product protection label, a banknote or the like.

11. A method of personalizing and/or individualizing a security element (114) and/or a security product (100) as claimed in claim 1, characterized in that at least one of the layers (104, 105, 106) whose color can be changed has its color changed in some regions (107, 108, 109) of the layer (104,105,106) in a first step, preferably by using laser radiation whose wavelength and/or intensity is in each case matched to the colorant that is present in the relevant layer and/or can be imaged, the regions of the layer whose color cannot be changed forming part of an item of personalization information and/or an item of information that individualizes the security element or security product or another item of information.

12. The method as claimed in claim 11, characterized in that the color change is carried out in the form of bleaching or removing and/or discoloring and/or making transparent, preferably to artificial and/or daylight, and/or a discoloring form.

13. The method as claimed in claim 11, characterized in that the color change is made in such a way that a region (108) that is colored and/or whose color can be changed and belongs to the second layer (105) is located with a vertical offset above a colored region (107) and/or above a region whose color can be changed and belongs to the first layer (104).

14. The method as claimed in claim 13, characterized in that the colored region (107) and/or the region whose color can be changed and belongs to the first layer (104) corresponds substantially in its extent to the extent of the colored region (108) and/or of the region whose color can be changed and belongs to the second layer (105), as a result of which the colored region and/or the region whose color can be changed and belongs to the first layer covers the colored region and/or the region whose color can be changed and belongs to the second layer in a largely vertical plan view of the security element (114) or security product (100), preferably substantially flush.

15. An apparatus for personalizing a security element and/or security product, characterized in that the apparatus for personalizing a security element (114) or security product (100) is modified in accordance with claim 11.

16. An apparatus for producing a security element and/or a security product, characterized in that the apparatus for producing a security element (114) or security product (100) is modified in accordance with claim 1.

* * * * *